United States Patent [19]

Kruklitis

[11] 4,034,342

[45] July 5, 1977

[54] MAGNETIC CHARACTER RECOGNITION SYSTEM EMPLOYING A DYNAMIC THRESHOLD VOLTAGE DETERMINATION SYSTEM

[75] Inventor: Karlis Kruklitis, Plymouth, Mich.

[73] Assignee: Burroughs Corporation, Detroit, Mich.

[22] Filed: Oct. 7, 1976

[21] Appl. No.: 730,431

Related U.S. Application Data

[63] Continuation of Ser. No. 535,361, Dec. 23, 1974, abandoned, which is a continuation-in-part of Ser. No. 394,293, Sept. 4, 1973, abandoned.

[52] U.S. Cl. .................................. 340/146.3 AG
[51] Int. Cl.² .................................. G06K 9/00
[58] Field of Search ............ 340/146.3 AG; 328/28; 358/161, 163, 166, 167

[56] References Cited

UNITED STATES PATENTS

| 3,159,815 | 12/1964 | Groce | 340/146.3 AG |
| 3,568,151 | 3/1971 | Majima | 340/146.3 AG |
| 3,668,634 | 6/1972 | Kruklitis | 340/146.3 AG |
| 3,675,201 | 7/1972 | McKissick et al. | 340/146.3 AG |

*Primary Examiner*—Leo H. Boudreau
*Attorney, Agent, or Firm*—David R. Syrowik; Leon E. Redman; Carl Fissell, Jr.

[57] ABSTRACT

An improved magnetic character recognition system employing a linearly operated dynamic or variable threshold voltage determination system and signal deterioration compensation circuits for expanding the range of dynamic information signals to which the dynamic threshold voltage determination system reliably responds to accommodate magnetically encoded characters that produce an unusually high or low strength magnetic flux for producing digital output pulses of uniform width throughout the expanded information signal range.

3 Claims, 7 Drawing Figures

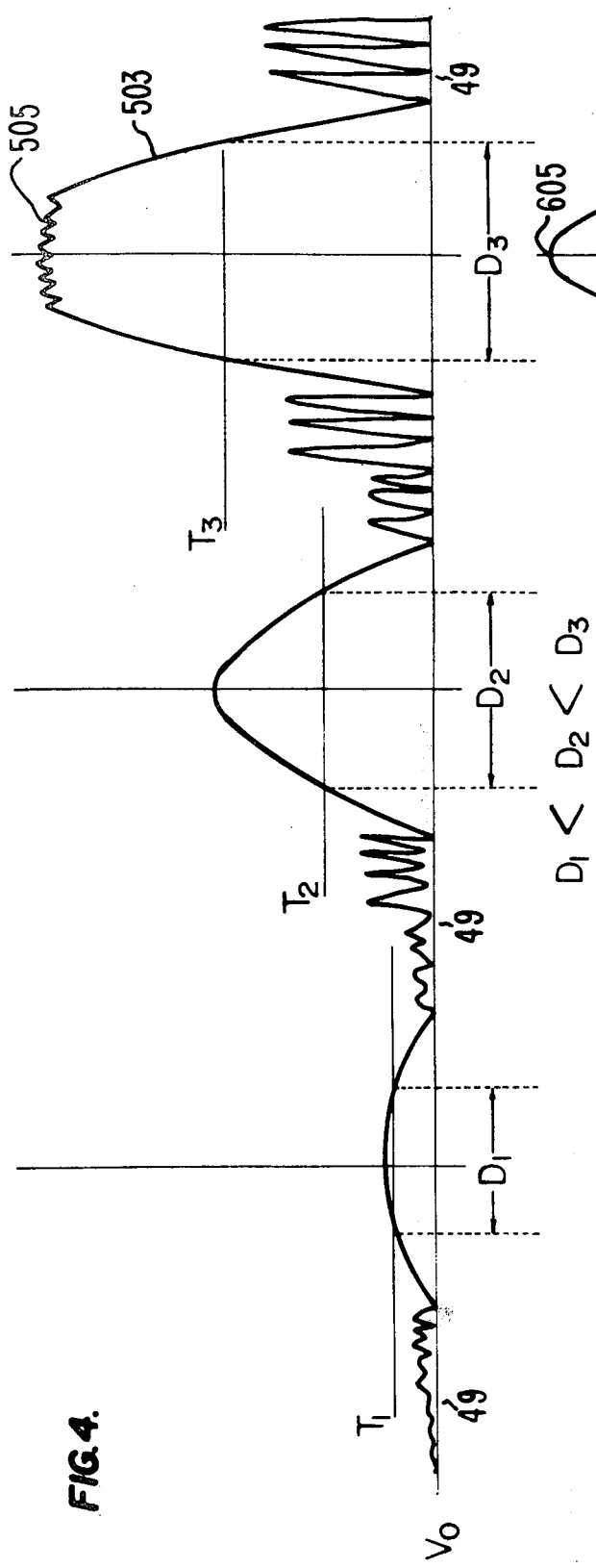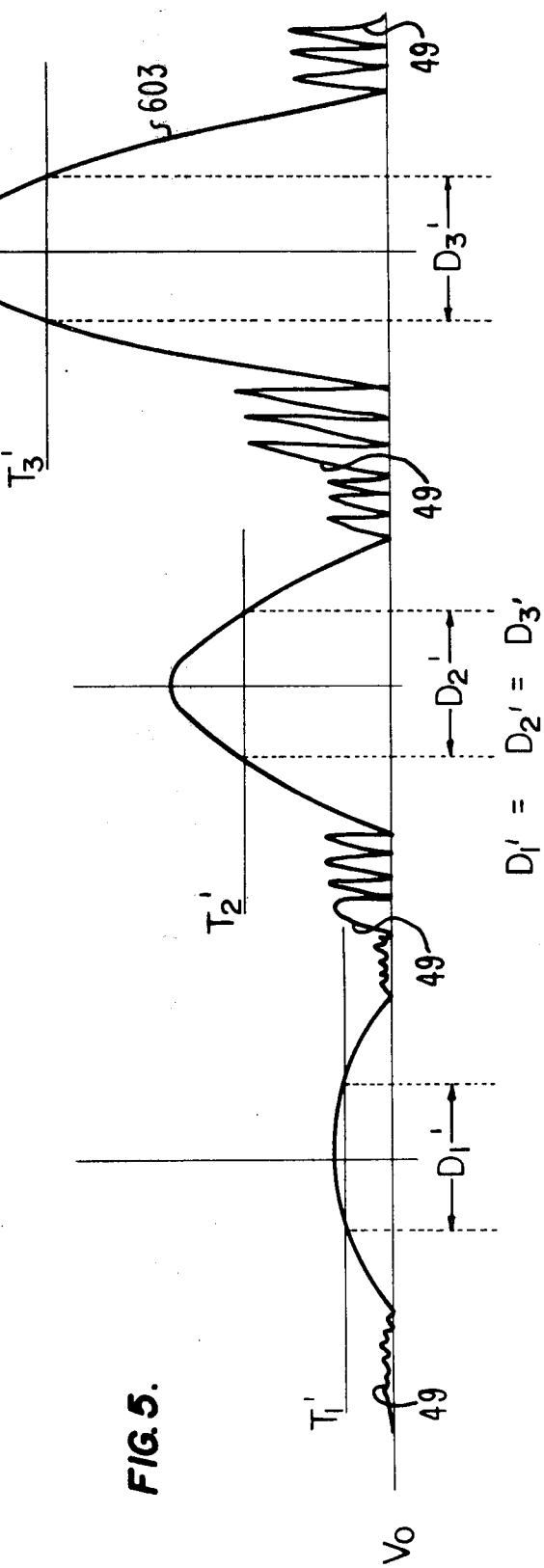

MAGNETIC CHARACTER RECOGNITION SYSTEM EMPLOYING A DYNAMIC THRESHOLD VOLTAGE DETERMINATION SYSTEM

RELATED APPLICATION

This is a continuation of application Ser. No. 535,361, filed Dec. 23, 1974, now abandoned, which in turn was a continuation-in-part of copending U.S. application Ser. No. 394,293, filed Sept. 4, 1973, now abandoned.

Background of the Invention

1. Field of the Invention

This invention relates in general to a dynamic voltage threshold system for neutralizing intertrack crosstalk in multi-channel magnetic character recognition systems and more particularly to an improved dynamic or variable voltage threshold system responsive to an extremely wide dynamic range of information signals for accommodating an unusual increase or decrease in the magnetic flux generated by a portion of a character being read in the character recognition system.

2. Description of the Prior Art

In prior character recognition systems, crosstalk between adjacent data tracks or channels presented serious problems in differentiating between the document background and the encoded character. A system has been recently invented that dynamically controls the threshold voltage for neutralizing or rendering ineffective crosstalk between adjacent electromagnetic transducers in multichannel magnetic character recognition systems. This system is fully described in U.S. Pat. No. 3,668,634 issued on June 6, 1972 of common inventorship and ownership herewith. This dynamic threshold voltage determination system discriminates between the document background and the magnetically encoded character quite effectively over a fairly wide dynamic range of information signals generated from adjacent electromagnetic transducing heads scanning adjacent portions of the magnetically encoded characters. This system has been commercially embodied in the B9134-1 reader sorter employing a MULTITRACK E 13B character recognition system manufactured by Burroughs Corporation, Detroit, Mich. In operation, this system properly and successfully recognizes magnetically encoded characters for over approximately 95% of the documents being read and sorted by the system. Thus, less than approximately 5% of processed documents are rejected because the magnetically encoded characters imprinted thereon cannot be recognized with a high degree of reliability.

The character recognition system employing the dynamic threshold voltage determination system of U.S. Pat. No. 3,668,634 handles a wide dynamic range of dynamic information signals. It has been determined that approximately 95% of the magnetically encoded documents processed through the prior dynamic threshold voltage determination system produces information signals in a 90% to 110% of nominal information signal range. Since over approximately 95% of processed documents were properly recognized, it can be appreciated that the prior dynamic threshold voltage determination system substantially reduced the document reject rate in character recognition systems, especially rejects attributable to undesirable cross-talk.

Any rejected document must, however, be processed individually by hand. Since this becomes a time consuming and expensive manual procedure for a large volume of documents, industry is continually making efforts to further reduce the number of documents rejected in character recognition systems.

Applicant has discovered that a major source of the problem of further reducing the number of documents rejected in a character recognition system employing a dynamic threshold voltage system is that some magnetically encoded characters produce an unusually small or large amount of magnetic flux, resulting in an information signal less than 25% or greater than 150% of a nominal information signal.

Applicant has also discovered that if a particular portion of a magnetically encoded character being scanned has been imprinted with an unusually excessive amount of iron oxide such that the resulting high strength magnetic flux produces an information signal having a voltage extreme or peak of over 300% of nominal. Applicant has further discovered that if the magnetically encoded character has been imprinted on a document distorted such that a portion of the magnetically encoded character is positioned extremely far from the electromagnetic transducing head, when the document is being read, then an information signal as low as 15% of nominal may also be produced. While either of these occurrences is unusual, they may cause the quantizers employed in a magnetic character recognition system to produce ambiguous pulses of non-uniform duration.

SUMMARY OF THE INVENTION

It is accordingly a principle object of the invention to further reduce the number of documents misread and rejected in a character recognition system employing a dynamic threshold voltage determination system.

It is a primary object of the invention to expand the dynamic range of information signals for which a dynamic threshold voltage determination system may operate in a magnetic character recognition system.

It is a further object of this invention to reliably recognize characters magnetically encoded on a document wherein a portion of a magnetically encoded character produces a magnetic flux significantly greater than the substantially uniform amount of magnetic flux produced by other similar magnetically encoded characters.

It is yet a further object of this invention to reliably recognize magnetically encoded characters that have been imprinted with an extremely excessive amount of iron oxide.

It is a still further object of this invention to reliably recognize characters magnetically encoded on a document distorted such that a portion of a magnetic character is positioned significantly farther from a magnetic transducing head resulting in a significantly lower amount of magnetic flux.

It is a still further object yet of the invention to provide a dynamic threshold voltage determination system that will reliably operate over a greatly expanded range of dynamic information signals.

It is an even further object yet to extend the operational range of a dynamic threshold determination system employed in a magnetic character recognition system to over 150% and under 25% of a nominal dynamic information signal.

It is a still further object of this invention to produce digital pulses of a uniform length or duration at the output of a quantizer to prevent misread of a character being scanned by transducing means in a dynamic threshold voltage controller that neutralizes the effects of crosstalk in a multi-channel character recognition system for an operational range extended to in excess of 300% and as low as 15% of a nominal dynamic information signal.

These and various other objects, advantages and meritorious features of the invention are achieved in a multi-channel character recognition system employing a dynamic threshold voltage system for neutralizing crosstalk between adjacent channels scanned by transducers individually providing dynamic information signals of respective portions of a magnetically encoded character being scanned, wherein the dynamic information signals are amplified by reduced gain amplifier means for extending the operational range of a current control device operating in the linear range that dynamically establishes a fixed threshold for a channel comparator at a level intermediate a reference voltage and a voltage extreme representative of the information signal.

A diode circuit, responsive to the transducers, provides an electrical voltage to the current control device. The portions of the voltage signals diminished by the somewhat reduced gain amplifier means and deteriorated by the diode circuit are restored to enable linear operation of the current control device for producing digital outputs of uniform duration from quantizers in the character recognition system over the entire expanded dynamic information signal range.

BRIEF DESCRIPTION OF THE DRAWINGS

FIG. 4 is a graphical illustration of the relationship between the threshold voltage and the pulse width for differing amplitudes of channel signals in a prior art magnetic character recognition system;

FIG. 5 is a graphical illustration of the relationship between the threshold voltage and the pulse durations for differing amplitudes of the channel signals in a system incorporating the present invention;

DETAILED DESCRIPTION OF THE INVENTION

Figure 1:
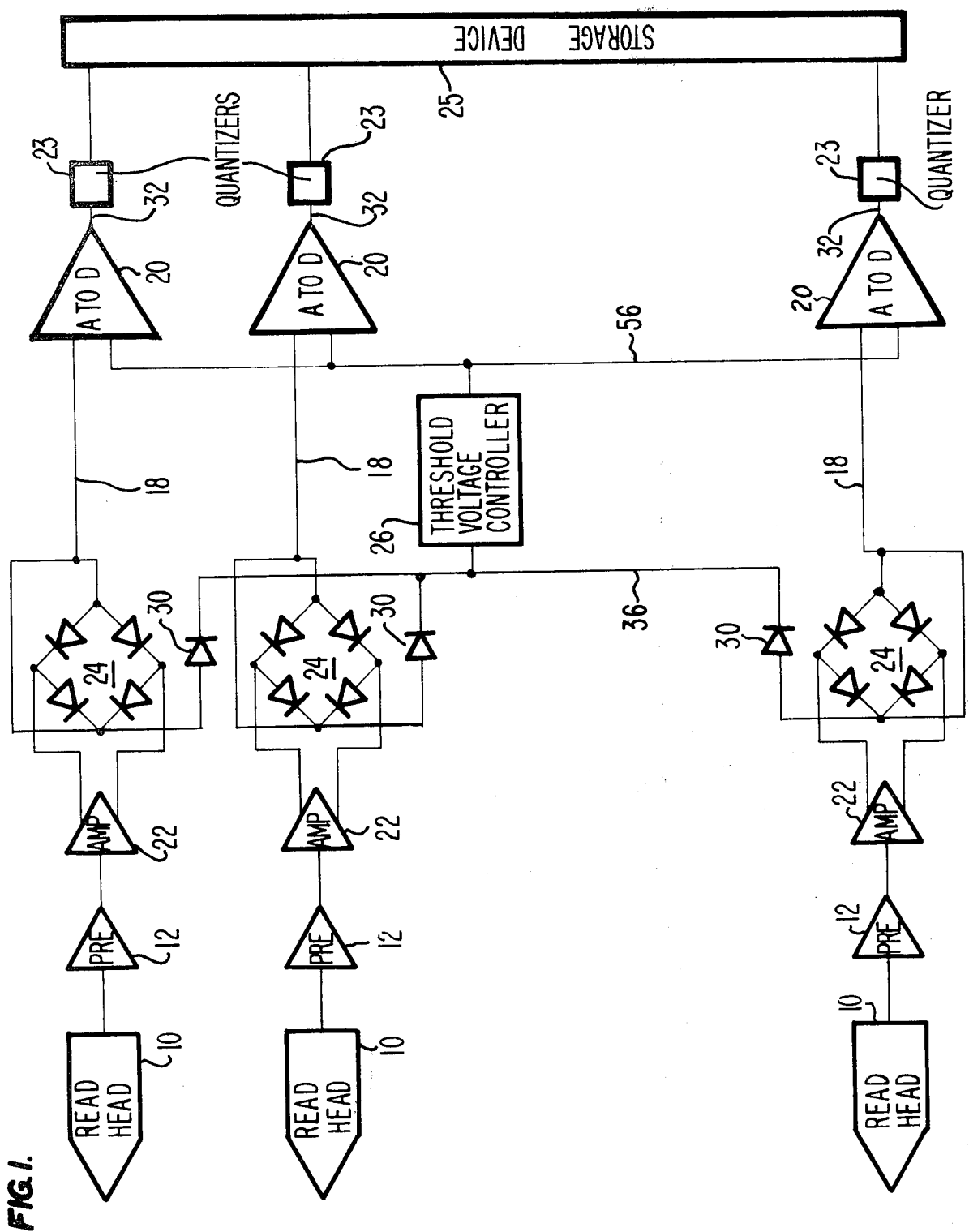
FIG. 1 is a block diagram of the circuitry of a magnetic character recognition system employing a dynamic threshold determination system.

In FIG. 1 there is illustrated by means of a block diagram the primary logic elements of a multi-channel magnetic character recognition system employing a dynamic threshold determination system such as the system disclosed in U.S. Pat. No. 3,668,634, which is incorporated by reference herein. In the system as shown in FIG. 1, a plurality of read heads 10, one for each channel, is provided. In the particular magnetic character recognition system utilized here for purposes of illustrating the preferred embodiment of the invention, three channels including three read heads 10 are shown. These read heads will each generate a dynamic information or analog channel signal in response to a respective portion of a magnetically encoded character passing thereunder. The strength or amplitude of this dynamic information or analog channel signal, generated by each of the read heads will be proportional to a number of factors including the amount of iron oxide in the ink and the distance of the magnetically encoded character from the read head as a portion of a character passes underneath.

Figure 3:
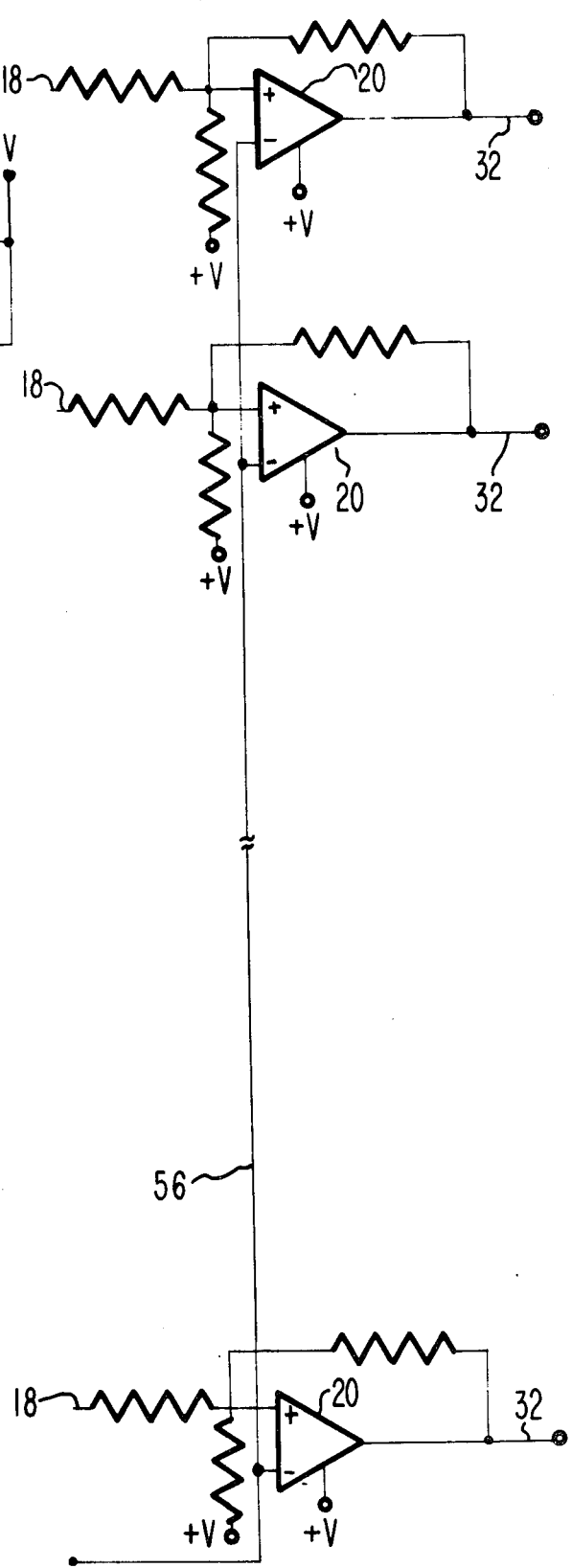
FIG. 3 is a schematic drawing of analog to digital converters of the improved magnetic character recognition system of the present invention.

Each of the channel signals generated by a respective read head 10 is in turn input to a respective preamplifier 12 and then on to a respective channel signal amplifier 22. The gain of each of the channel signal amplifiers 22 in the dynamic threshold voltage determination system of U.S. Pat. No. 3,668,634 had been adjusted to approximately 240,000 in order to provide a wide dynamic range of operation. Each of the amplified channel signals is rectified by a respective full-wave rectifier 24 into a rectified channel signal of a single polarity. The rectified components of each channel signal are then individually combined and provided via respective lines 18 to respective analog to digital converter 20. The analog to digital converters 20 may comprise voltage comparator circuits as illustrated in FIG. 3. The analog to digital converters 20 each generate a digital output in response to each of the respective amplified and rectified channel signals received via line 18. The digital output from each of the analog to digital converters 20 is in turn fed via line 32 as input to respective quantizers 23. The quantizers 23 provide digital pulses to a storage device 25 according to the width of the digital output on line 32 of the respective analog to digital converters 20 so that each magnetic character that passes underneath the read heads 10 may be properly identified in the character recognition system.

In addition to the above-described elements of the magnetic character recognition system there is also a threshold voltage controller 26. The threshold voltage controller has the function of providing a threshold voltage to the voltage comparator circuits 20 so that the digital output of each of the comparator circuits 20 will have a uniform duration for different amplitudes of the channel signal. It is also a related function of the threshold voltage controller to raise the threshold of the comparator circuits 20 so that the noise elements of the channel signals such as cross-talk do not trigger spurious pulses from the comparator circuits 20. The threshold voltage controller circuit 26 utilizes as input the first portion of the rectified channel signal for each of the channels. These channels are combined on line 36 of FIG. 1 which effectively provide the threshold voltage controller 26 with the highest or largest channel signal output from one of a plurality of diodes 30.

For a more detailed description of a multi-channel character recognition system employing a dynamic threshold determination system reference should be made to U.S. Pat. No. 3,668,634 which is incorporated by reference herein.

In FIG. 3 of the drawing the analog to digital converters 20, utilized with the preferred embodiment of the invention, are illustrated in detail. As indicated in FIG. 1, there will be one voltage comparator circuit 20 for each channel in the magnetic character recognition system. Each of the analog to digital converters 20 include a comparator circuit wherein the rectified channel signal is input to respective positive comparator circuit terminals via respective lines 18. Similarly, the threshold or triggering voltage of each of the comparator circuits 20 is input to respective negative terminals of the comparator circuit 20 via line 56 from the threshold voltage controller 26 of FIG. 2. The output of each of the comparator circuits 20 will be a digital signal on a respective line 32 that will be equal in duration to the amount of time that the rectified channel signal on the respective line 18 exceeds the value of the threshold voltage on line 56.

Figure 2:
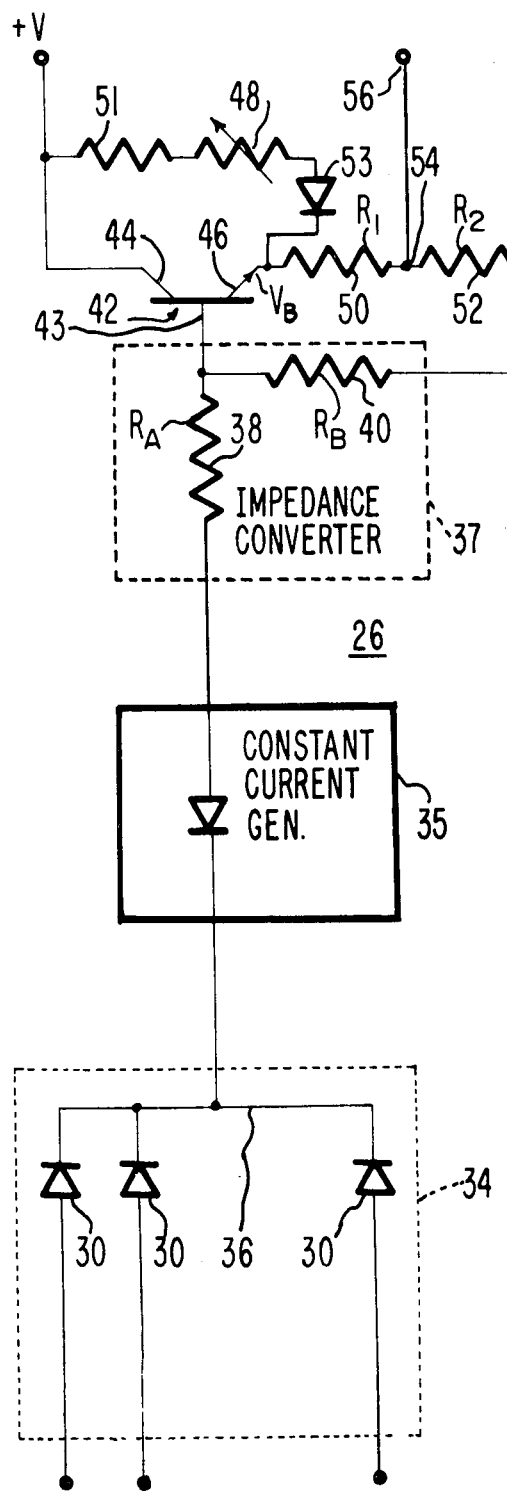
FIG. 2 is a schematic drawing of a portion of an improved dynamic threshold voltage determination system.

The preferred embodiment of the threshold voltage controller 26, that is used within the context of a magnetic character recognition system as illustrated in FIG. 1, to provide digital outputs of uniform duration on line 32 from each of the comparator circuits 20, is illustrated in FIG. 2. The preferred embodiment of the threshold voltage controller operates by utilizing as input the leading wave of the rectified channel signal from the full-wave rectifiers 24 of FIG. 1. The signals output from the full-wave rectifiers 24 are combined in a diode mixer 34 (FIG. 2) which comprises the diodes 30 of FIGS. 1 and 2. The diode mixer 34 will then produce a signal on line 36 that is representative of the largest amplitude of any one of the channel signals. This largest amplitude signal is then input via line 36 to a constant current generator 35 which is utilized in the circuit of the threshold controller 26 to unilaterally conduct current in the opposite direction that the diodes 30 of the diode mixer 34 conduct to compensate for signal deterioration from the voltage drop across those diodes 30. Without the constant current generator 35 an approximately .7 volt drop across each of the diodes 30 would prevent low amplitude channel voltage signals from activating the threshold voltage controller 26. There is also included in the threshold voltage controller 26 an impedance converter 37 for providing a very high impedance input to a current control transistor 42. The impedance converter 37 which comprises resistors $R_A(38)$ and $R_B(40)$ has a low impedance input electrically coupled to the output of the constant current generator 35 and a high impedance electrically connected to the base 43 of the current control transistor 42. The resistors $R_A$ and $R_B$ (38 and 40) serve as means for dynamically controlling the enabling voltage or base voltage $V_B$ of the transistor 42 wherein the value of the voltage $V_B$ will be proportional to the relation $(R_B/R_A + R_B)$. By adjusting the resistors $R_A$ and $R_B$ the enabling voltage of the transistor 42 may be set so as to cause the transistor 42 to respond only to a signal voltage above a predetermined value for conducting current.

The component value of the resistors $R_1$ and $R_2$ (50 and 52) of the voltage divider 54, along with the resistor 51 connected in series with the variable resistor 48 are all chosen in light of the gain of the current control transistor 42 so as to enable linear operation of the current control transistor for information signals above 150% of nominal information signals, according to the relationship described hereinafter. Nominal information signal voltage levels as specified by the Bank Administration Institute vary from character to character. For example, a "zero" character is specified as having a 130 millivolt nominal information signal. The largest nominal information signal is specified as 165 millivolts for a "nine" character.

Representative parameter values for the components in the preferred mode of operation of the circuit of FIG. 2 are as follows: Resistor $R_A(38)$ is 121K ohms, resistor $R_B(40)$ is 147K ohms, resistor $R_1(50)$ is 634 ohms, resistor $R_2(52)$ is 51.1 ohms, variable resistor 48 is 20K ohms, variable resistor 51 is 2.67K ohms, and transistor 42 is an NPN planar type transistor manufactured by General Electric model number 2N3391A.

A diode 53 is provided with its anode electrically coupled to one end of the variable resistor 48 and its cathode electrically coupled to the emitter 46 of the current control transistor 42.

When the transistor 42 is in a non-conducting state, i.e. where the voltage $V_B$ is below the transistor's enabling voltage, the output 56 of the threshold voltage controller will be a function of the adjustable resistor 48. Therefore, by adjusting the resistor 48, the minimum threshold voltage on line 56 and hence the minimum voltage to which the voltage comparator 20 will respond may be adjusted and set. In this way the minimum signal that the magnetic character recognition system as a whole will respond to may be varied in order to conform to different industry and operating standards.

In FIG. 4 of the drawings the threshold voltages $T_1$, $T_2$ and $T_3$ for varying amplitudes of channel signals are illustrated as they would occur in a magnetic character recognition system not employing the improved dynamic threshold voltage determination system of the present invention. Assuming as is the case in most practical applications, that the duration of the channel signals themselves are essentially the same and that the only variation is in the amplitude, the raising of the threshold voltage $T_1$, $T_2$ and $T_3$ in order to prevent the noise or cross-talk portions 49 of the channel signal from triggering pulses on the voltage comparator circuits 20 of FIG. 3 will cause the actual duration of the pulses $D_1$, $D_2$ and $D_3$ of FIG. 4 to be of corresponding longer amounts of time. As will be noted from the example of FIG. 4, the larger the amplitude of the channel signal the larger will be the duration $D_1$, $D_2$ and $D_3$ of the output pulse of the comparator circuit 20 (FIGS. 1 and 3). It can be seen in FIG. 4 that a portion 505 of the voltage waveform 503 has become truncated and irregularly deformed in comparison with the voltage waveform 603 of FIG. 5. The relatively flat irregular peak 505 of the voltage waveform 503 is caused by the saturation and non-linear operation of the current control transistor 42 (FIG. 2) in response to a channel signal exceeding 150% of a nominal information signal. As explained in U.S. Pat. No. 3,668,634, the dynamic threshold is established relative the voltage peak of the largest amplitude signal on line 36. Therefore, when the peak 505 of the voltage waveform 503 is truncated as shown in FIG. 4, which is the result of a channel signal greater than 150% of a nominal information signal, then the threshold $T_3$ is established at a lower level than would be otherwise established and results in a digital output from comparator 20 whose extreme width $D_3$ will cause a double pulse output from the quantizer 23 and the misread displayed in FIG. 6. For example, a comparison may be made between the extreme output pulse width $D_3$ of FIG. 4 and the width $D_3$ which occurs when the current control transistor 42 (FIG. 2) does not saturate and continues operating in the linear region. The pulse width $D_3$ will be long enough to cause the quantizers 22 of FIG. 1 to read, or to count, two marks on the end of the "zero" character and in turn produce double output pulses to the storage device 25 (FIG. 1) resulting in the misread character displayed in FIG. 6. This character misread necessitates a subsequent rejection of the document. It can be seen therefore that if the duration of the output pulse $D_3$ of FIG. 4 is permitted to become excessive, such as when the channel signal exceeds 150% of a nominal information signal, the result will be a document rejection in the magnetic character recognition system.

In order to prevent this from occurring, the improved dynamic threshold voltage determination system prevents low establishment of the threshold voltages such as in $T_1'$, $T_2'$ and $T_3'$ of FIG. 5, by enabling each threshold to properly follow its respective peak so that the durations $D_1'$, $D_2'$ and $D_3'$ of the pulses will be approximately equal regardless of the variations in the amplitude of the channel signals as long as the channel signals do not greatly exceed 300% or become less than 15% of a nominal information signal. As previously indicated, the output of the threshold voltage controller will appear on line 56 and, as can be seen from FIG. 2, is a function of the values of the resistors $R_1(50)$ and $R_2(52)$ of the voltage divider. The slope of the voltage on line 56 will be equal to the linear relation $(R_1 + R_2/R_2)$.

Therefore, the values of $R_1(50)$ and $R_2(52)$ are adjusted to provide for a slope of increasing voltage that will result in the threshold voltages $T_1'$, $T_2'$ and $T_3'$ of FIG. 5.

Figure 7:
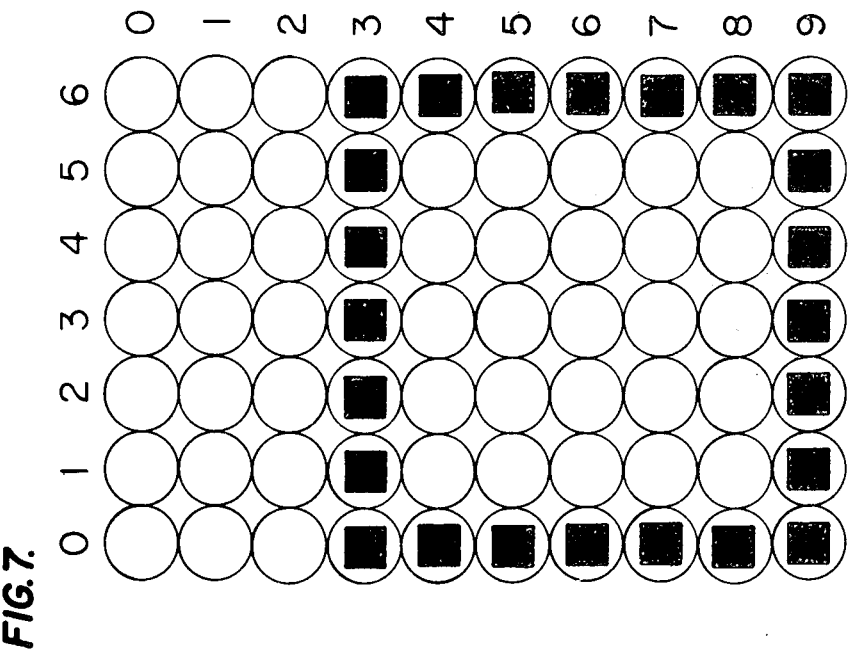
FIG. 7 is a display of the proper reading of a magnetically encoded character having an extremely high signal strength by a magnetic character recognition system incorporating the present invention.
Figure 6:
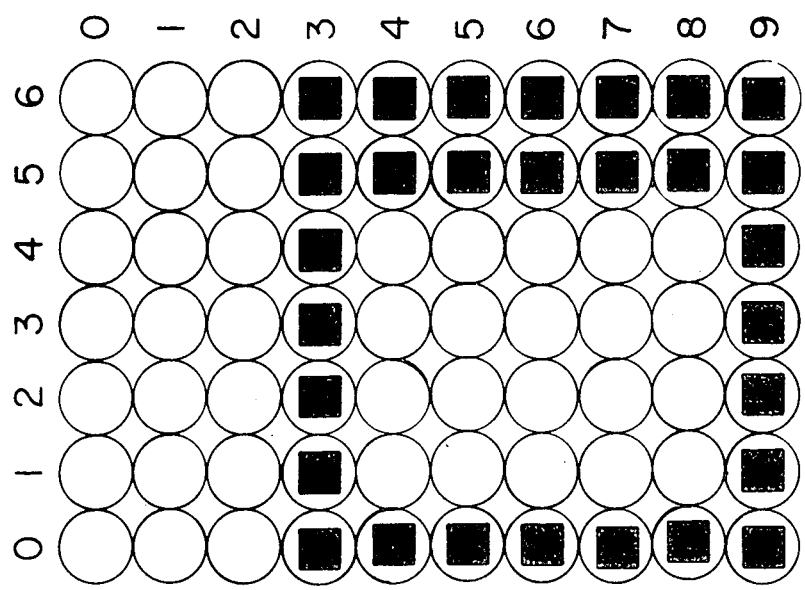
FIG. 6 is a display of misreading a magnetically encoded character with an extremely high signal strength by a device of the prior art.

When the duration of the channel signals are uniform, a correct reading of the magnetically encoded characters will be given, as illustrated for the "zero" character displayed in FIG. 7 as opposed to the incorrect reading illustrated in FIG. 6.

In addition, the parameters of the various components of the magnetic character recognition system of FIG. 1 are adjusted so that the channel signal of the largest amplitude in the preferred embodiment up to 300% of the nominal information signal do not saturate the system producing the waveform 503 of FIG. 4. In the preferred embodiment of the invention the gain of each of the channel amplifiers 22 is lowered to approximately 60,000. By preventing the saturation of the waveform 50 the danger of having the voltage comparators 20 unable to read channel signals from the highest amplitude are significantly reduced. Thus a magnetic ink character recognition system is provided that has a greatly expanded operational range for handling information signals as low as 15% or as high as 300% of a nominal information signal.

What is claimed is:

1. A dynamic threshold voltage determination system of a character recognition system comprising:
    amplifying means for amplifying a dynamic information signal, the signal having an information signal range from greater than 150% to less than 25% of a nominal information signal;
    a threshold voltage controller responsive to the amplified dynamic information signal for dynamically establishing a threshold voltage signal proportionate to the amplified dynamic information signal, the threshold voltage signal being established for a substantially uniform duration within the information signal range;
    said voltage controller including:
        a current control device responsive to a predetermined amount of the amplified dynamic information signal; and
        linear operating means for allowing the linear operation of said current control device within the information signal range; and
    first comparator means for comparing the voltage level of the amplified dynamic information signal with the voltage level of the threshold voltage signal, said first comparator means producing output pulses of substantially uniform width throughout said information signal range in response to the threshold voltage signal of substantially uniform duration.

2. The system as defined in claim 1, wherein said linear operating means includes a constant current generator disposed between said amplifying means and said current control device for establishing said predetermined amount of amplified dynamic information signal to allow for the linear operation of said current control device when the amplified dynamic information signal is less than 25% of the nominal information signal.

3. A method of expanding the operational range of a dynamic threshold voltage determination system employed in a magnetic character recognition system, the operational range being expanded to accommodate dynamic information signals that may vary from greater than 150% to less than 25% of a nominal information signal, the dynamic threshold determination system including amplifier means for amplifying the dynamic information signals and the amplifying means coupled to a current control device of a threshold voltage controller, the current control device being responsive to a predetermined amount of the amplified dynamic information signal, the threshold voltage controller dynamically establishing a threshold voltage for a substantially uniform duration, the threshold voltage being proportional to the amplified dynamic information signals, the method comprising the steps of:
    adjusting the gain of said amplifier means for linear operation of said current control device throughout the expanded dynamic information signal range; and
    maintaining constant current between the amplifier means and the current control device to allow for the linear operation of the current control device when the amplified dynamic information signals are less than 25% of a nominal information signal.

* * * * *